United States Patent Office 3,063,781
Patented Nov. 13, 1962

3,063,781
METHOD FOR TANNING LEATHER WITH AMINO-PLASTS AND COMPOSITIONS THEREFOR
Charles A. Fetscher, Short Hills, and Stanley Lipowski, Newark, N.J., assignors to Nopco Chemical Company, Harrison, N.J., a corporation of New Jersey
No Drawing. Filed Oct. 29, 1959, Ser. No. 849,436
13 Claims. (Cl. 8—94.33)

This invention relates, in general, to novel anionic aminoplast resin compositions and to a process for producing same. More particularly, the invention relates to the use of these resin compositions in the treatment of tanned leather.

In recent years, various synthetic organic polymers, for example, certain anionic aminoplast resins, have been disclosed as suitable for use in the after-treatment of tanned leather. Compositions suitable for such use are commonly referred to, and, for convenience, they will be referred to herein, as retanning agents. In general, tanned leather is retanned to enhance and improve the properties thereof. Thus, the use of a retanning agent may be resorted to to improve the pigment retention characteristics of tanned leather. Pigment retention is an extremely imporant factor, for example, in the case of white, chrome tanned leather. Moreover, the treatment of tanned leather with a retanning agent may result in the production of leather having superior physical properties. For example, certain retanning agents have been found to be capable of improving the grain of leather while others have been found to be capable of providing a plump, soft and level piece of leather with enhanced cutting properties. Moreover, the ability of leather to withstand discoloration, even when exposed to ultra violet light for long periods of time, has been improved when the tanned leather is treated with a retanning agent. Unfortunately, however, few, if any, of the retanning agents of the art provide all of these advantages.

It is the object of this invention to provide novel anionic aminoplast resin compositions.

A further object of the invention is to provide a method for producing these compositions.

A more particular object of the invention is to provide anionic aminoplast resin compositions which are suited for use in the after-treatment of tanned leather to provide a product having greatly improved properties.

Other objects of the invention will be obvious and will, in part, appear hereinafter.

It has been discovered that when a combination of melamine and dicyandiamide is mixed with formaldehyde and an alkali bisulfite or an alkali metabisulfite at an elevated temperature and when the product produced during the reaction of those ingredients is subsequently treated with urea, an anionic aminoplast resin composition is obtained which, when used as a retanning agent, improves greatly the properties and characteristics of leather.

In the preparation of the products of this invention, a mixture of melamine and dicyandiamide is first prepared. This is accomplished simply by adding one of these ingredients to the other and mixing same at room temperature. Thereafter, an alkali bisulfite or an alkali metabisulfite and formaldehyde are added to, and mixed with, the melamine-dicyandiamide mixture. An exothermic reaction occurs on mixing these ingredients. Depending, for the most part, upon the size of the batch, the temperature of the reaction mass will rise from room temperature to a temperature within the range of from about 40° C. to about 55° C. without the application of external heat. When the exothermic reaction has generated the maximum reaction temperature, the mass is then heated, at a moderate rate, to its reflux temperature. In most instances, the mixture will reflux at a temperature within the range of from about 95° C. to 100° C. The reaction mass is stirred and maintained at reflux for the period of time necessary to drive the reaction to substantial completion. As a general rule, heating of the reaction mixture at reflux temperature for a period of about two hours will be sufficient to accomplish this. After this heating step is completed, urea is added to the reaction mixture and mixed therewith. In the preferred embodiment of the invention, the reaction mixture is cooled somewhat from its reflux temperature, for example, to a temperature of about 70° C., prior to the addition of urea thereto. After the addition of urea has been completed, the reaction mixture is stirred and heated once again, preferably to its reflux temperature, for a short period of time. Under ordinary circumstances it will suffice to maintain the reaction mixture at its reflux temperature, with stirring, for a period of about 30 minutes. This step of the process can be carried out at a temperature which is below the reflux temperature of the mixture, if desired. However, when lower temperatures are employed, a longer heating period will be employed.

The quantities of the various ingredients which are used in preparing our novel products can be varied within the limits set forth herein. For example, a ratio of about 1.3 mols to about 1.7 mols of dicyandiamide can be employed for each mol of melamine used. Moreover, a ratio of from about 1.3 mols to about 1.7 mols of alkali bisulfite or alkali metabisulfite and a ratio of from about 8.0 mols to about 12.0 mols of formaldehyde can be used for each mol of melamine present in the melamine-dicyandiamide mixture. Finally, a ratio of from about 1.5 mols to about 2.0 mols of urea is added to the heated reaction mixture for each mol of melamine employed originally. However, in producing the preferred products of the invention, a ratio of about 1.5 mols of dicyandiamide, about 1.5 mols of the alkali bisulfite or alkali metabisulfite, about 10.0 mols of formaldehyde and about 1.5 mols of urea is employed for each mol of melamine in use.

In the foregoing description, reference has been made to the use of formaldehyde. In the preferred embodiment of the invention, formalin, a 37% aqueous solution of formaldehyde, is employed as the source of formaldehyde. The invention is not restricted, however, to the use of formalin. If desired, formaldehyde in any of its polymeric forms, as, for example, paraformaldehyde, trioxane, etc., can be used. Accordingly, where the term "formaldehyde" is used in the present specification and claims, it should be construed as encompassing not only formalin but also any of the various other forms of formaldehyde as well. However, in those instances in which paraformaldehyde, trioxane, or some other polymeric form of formaldehyde, is used, such compound will be added to water prior to being mixed, in the manner described heretofore, with melamine, dicyandiamide and the alkali bisulfite or alkali metabisulfite. While the quantity of water which is introduced into the reaction system as a result of the use of aqueous formaldehyde is not particularly critical, we have found that the most satisfactory results will be obtained when the required quantity of formaldehyde, namely, a ratio of from about 8.0 mols to about 12.0 mols of formaldehyde for each mol of melamine, is provided in the form of a 30.0% to 40.0%, by weight, aqueous solution.

In general, any inorganic alkali bisulfite or any inorganic metabisulfite can be used in the practice of this invention. Thus, for example, alkali bisulfites, such as, sodium bisulfite, potassium bisulfite, and alkali metabisulfites, such as sodium metabisulfite, potassium metabisulfite etc. can be employed. In the preferred embodiment of the invention, however, sodium bisulfite or sodium metabisulfite is used.

As obtained from the procedure heretofore described, the reaction products are of syrupy consistency and hazy in appearance. Clear products can be obtained from the hazy syrups simply by filtering same. The products of the invention are completely water-soluble and indefinitely stable. No change in the appearance of the product or in its viscosity, clarity or soblubility has been observed when the product has been allowed to stand at ordinary room temperatures, even for long periods of time.

Ase indicated heretofore, the products of this invention have been found to be excellent retanning agents. The manner in which these products are employed in industry will be quite obvious to those skilled in the art. Specific applications of the products will be found, however, in the example which follows hereinafter. It is to be noted that our products are eminently well suited for use in connection with the retanning of both light and heavy leather stock. Extremely important is the fact that the suitability of these products for use as retanning agents is not all dependent upon the identity or the nature of the tannage employed in tanning the leather. Leather which has been tanned with any of the various known tanning agents, as, for example, vegetable tannage, chrome tannage, etc., can be retanned with excellent results using our products. In general, it will be found that when the products of this invention are employed as retanning agents, leather of increased plumpness and pliability and improved grain will be obtained. Moreover, a product having superior pigment retention will be obtained when tanned leather is treated with the products of this invention. Our products will not discolor, or even tend to discolor, leather treated therewith. This will be found to be true even when the leather is subjected to ultra violet light for extremely long periods of time.

We have not as yet determined why the products of our invention bring about such outstanding and totally unexpected results when used to retan leather. It is believed, however, some synergistic effect is brought about by the use of a combination of melamine and dicyandiamide in the manufacture of the resin and that this contributes greatly to the utility of the product. When a quantity of melamine, equivalent in weight to the quantity of melamine-dicyandiamide which is used in the formulation of our product, is reacted with formaldehyde, an alkali bisulfite or metabisulfite and urea, in the manner described herein, an unstable, and hence unsatisfactory, product, which gels after a short time, is obtained. Moreover, when a quantity of dicyandiamide, which is equivalent in weight to the quantity of melamine-dicyandiamide that is used in producing our products, is reacted with formaldehyde, an alkali bisulfite or metabisulfite and urea, in the manner described herein, a product having inferior tanning properties is obtained. Since products produced from melamine alone and from dicyandiamide alone are unsatisfactory, the complete effectiveness of our product appears to be attributable, at least in part, to the use of a mixture of melamine and dicyandiamide in its formulation.

For a fuller understanding of the nature and objects of this invention, reference may be had to the following example which is given merely as a further illustration of the invention and is not to be construed in a limiting sense. All parts given in the examples are parts by weight, unless otherwise indicated.

*Example 1*

In this example, 300 parts of melamine and 300 parts of dicyandiamide were first charged into a suitable vessel and intimately admixed at room temperature. Thereafter, 359 parts of sodium meta-bisulfite and 1925 parts of formaldehyde (37%) were added to, and mixed with, the melamine-dicyandiamide mixture. On mixing, an exothermic reaction ensued. The temperature of the reaction mass rose to about 45° C. without the application of external heat. When the temperature of the reaction mass ceased to rise, the mass was heated, with stirring, at moderate rate to its reflux temperature. The heating rate was adjusted so as to reach a temperature of about 100° C. over a period of about 30 minutes. The mass was thereafter refluxed for a period of about 2 hours. At the end of this time, the reaction mass was cooled to a temperature of about 70° C. and, at that temperature, 214 parts of urea was added thereto and mixed therewith. The mixture was then heated to its reflux temperature and maintained at that temperature for a period of about 30 minutes. At the end of that period of time, the reaction mixture was cooled to a temperature of about 45° C. and filtered to provide a brilliant water-like fluid of syrupy consistency.

The product was found to be readily soluble in water and it was found to be indefinitely stable at ordinary room temperatures.

The product of this example was evaluated for use as a retanning agent for leather in the following manner: chrome tanned sides from cow hide were placed in a drum containing twice their weight of water. Prior to adding the hides thereto, the water had been heated to a temperature of 130° F. The stock was drummed in this water for a period of about 10 minutes at a temperature of 124° F., following which the water was drained from the drum. Thereafter, the stock was floated in a solution comprising twice its weight of water, and 5.0%, by weight, based on the shaved weight of stock, of the product of this example. The solution also contained, as a dispersing agent, 2.0%, by weight, based on the shaved weight of the stock, of a neutral sodium salt of a condensed naphthalene sulfonate, produced and sold under the trademark Nopcosant by Nopco Chemical Company, Newark, New Jersey. The solution was heated to a temperature of about 120° F. and the stock was drummed therein for a period of about 30 minutes.

At the end of that time, a solution comprising 3.0%, by weight of sodium chloride and 25.0%, by weight, of water, each of said weights being based on the shaved weight of the stock, was added to the drum. Thereafter, the stock was drummed in that solution for a period of about 15 minutes at a temperature of 120° F. At the end of that period of time, an aqueous alum solution, heated to a temperature of 120° F., was added to the drum in three feeds of equal weight. The alum solution comprised 5.0% by weight of alum and 25.0% of water, each of said weights being based on the shaved weight of the stock in the drum. The stock was then drummed in the solution for a period of 45 minutes at a temperature of about 120° F.

At the end of that period of time, the solution was drained completely from the drum. Thereafter, the stock was floated once again in fresh water which had been heated to a temperature of about 130° F. The stock was washed therein for a period of about 5 minutes at a temperature of about 135° C., following which all of the water was drained from the drum. The stock was then floated once again in twice its weight of water, heated to a temperature of about 125° F. Thereafter, 1.0% by weight of sodium hexametaphosphate, said weight being based on the shaved weight of the stock, was added to the water. The stock was drummed in this solution for a period of about 10 minutes, following which a fat-liquor was added thereto. The stock was drummed in this solution for a period of about 30 minutes. Thereafter, there was added to the solution 3.0% by weight, of titanium dioxide and 4.0%, by weight, of a paste-like mixture of white pigments in water, each of said weights being based on the shaved weight of the stock. The stock was drummed in this solution for a period of about 10 minutes, following which it was removed therefrom and allowed to air dry.

The leather treated in the manner heretofore described was characterized especially by its plumpness, its strength and by the smoothness of its grain. The leather had an excellent white color indicating superior pigment retention.

The product for this example was evaluated for use also as a retanning agent for splits for upholstery leather. The splits employed had been subjected, previously, to a two bath chrome pretan. In evaluating the product for use in connection with such splits, the splits were floated in a solution comprising twice their weight of water and about 15.0%, by weight, based on the shaved weight of the splits, of the product of this example. Prior to adding the splits thereto, the solution had been heated to a temperature of about 120° F. The splits were drummed in this solution for a period of about 1 hour with the temperature of the solution being maintained at about 120° F. during that time. Thereafter, an aqueous alum solution was added to the water in three feeds of equal weight, following which the splits were drummed in the solution thus obtained for a period of about 45 minutes. The alum solution which was added comprised 5.0% by weight of alum and 25.0% by weight of water, each of said weights being based on the shaved weight of the splits. At the end of this procedure, the solution was drained from the drum and the splits were washed in water, subsequently fat-liquored and dried.

The upholstery leather splits, treated as indicated herein, were characterized by the plumpness and pliability and superior strength. Moreover, these splits had a very tight and smooth grain.

Having described our invention what we claim as new and desire to secure by Letters Patent is:

1. A completely water-soluble and indefinitely stable anionic aminoplast resin produced by mixing (a) melamine, (b) dicyandiamide, (c) formaldehyde and (d) a compound selected from the group consisting of an inorganic alkali bisulfite and an inorganic alkali metabisulfite, heating said mixture to its reflux temperature, subsequently adding (e) urea thereto and heating the mixture thus obtained at an elevated temperature, there being present in the reaction mixture a ratio of from about 1.3 mols to about 1.7 mols of (b), from about 8.0 mols to about 12.0 mols of (c), from about 1.3 mols to about 1.7 mols of (d), and from about 1.5 mols to about 2.0 mols of (e), for each mol of (a) employed.

2. A completely water-soluble and indefinitely stable anionic aminoplast resin produced by mixing (a) melamine, (b) dicyandiamide, (c) formaldehyde and (d) an inorganic alkali bisulfite, heating said mixture to, and maintaining it at, its reflux temperature for a period of about two hours, subsequently adding (e) urea thereto and heating the mixture thus obtained to its reflux temperature and maintaining said mixture at about reflux temperature for a period of about thirty minutes, there being present in the reaction mixture a ratio of from about 1.3 mols to 1.7 mols of (b), from about 8.0 mols to about 12.0 mols of (c), from about 1.3 mols to about 1.7 mols of (d), and from about 1.5 mols to about 2.0 mols of (e), for each mol of (a) employed.

3. A completely water-soluble and indefinitely stable anionic aminoplast resin produced by mixing (a) melamine, (b) dicyandiamide, (c) formaldehyde and (d) an inorganic alkali metabisulfite, heating said mixture to, and maintaining it at, its reflux temperature for a period of about two hours, subsequently adding (e) urea thereto and heating the mixture thus obtained to its reflux temperature and maintaining said mixture at about reflux temperature for a period of about thirty minutes, there being present in the reaction mixture a ratio of from about 1.3 mols to 1.7 mols of (b), from about 8.0 mols to about 12.0 mols of (c) and from about 1.3 mols to about 1.7 mols of (d) and from about 1.5 mols to about 2.0 mols of (e) for each mol of (a) employed.

4. Tanned leather retanned with the product of claim 2.

5. Tanned leather retanned with the product of claim 3.

6. A completely water-soluble and indefinitely stable anionic aminoplast resin produced by mixing (a) melamine, (b) dicyandiamide, (c) formaldehyde and (d) a compound selected from the group consisting of an inorganic alkali bisulfite and an inorganic alkali metabisulfite, heating the mixture to, and maintaining it at, its reflux temperature for a period of about two hours, subsequently adding (e) urea thereto and heating the mixture thus obtained to its reflux temperature and maintaining said mixture at about reflux temperature for a period of about thirty minutes, there being present in the reaction mixture a ratio of about 1.5 mols of (b), about 10.0 mols of (c), about 1.5 mols of (d) and about 1.5 mols of (e) for each mol of (a) employed.

7. Tanned leather retanned with the product of claim 6.

8. The product of claim 6 wherein (d) is an inorganic alkali bisulfite.

9. The product of claim 6 wherein (d) is an inorganic alkali metabisulfite.

10. The product of claim 8 where the inorganic alkali bisulfite is sodium bisulfite.

11. The product of claim 8 wherein the inorganic alkali bisulfite is potassium bisulfite.

12. The product of claim 9 wherein the inorganic alkali metabisulfite is sodium metabisulfite.

13. The product of claim 9 wherein the inorganic alkali metabisulfite is potassium metabisulfite.

References Cited in the file of this patent

UNITED STATES PATENTS 2,412,855    Auten et al. _____ Dec. 17, 1946

FOREIGN PATENTS 556,142    Great Britain _____ Sept. 22, 1943
747,183    Great Britain _____ Mar. 28, 1956